US009385636B2

(12) United States Patent
Hung et al.

(10) Patent No.: US 9,385,636 B2
(45) Date of Patent: Jul. 5, 2016

(54) TRANSPORT VEHICLE, CHARGING SYSTEM AND ELECTRICITY-GENERATING TIRE

(71) Applicant: NATIONAL TAIWAN NORMAL UNIVERSITY, Taipei (TW)

(72) Inventors: Yi-Hsuan Hung, Taipei (TW); Gao-Yuan Lin, Taichung (TW); Yu-Xuan Lin, Yilan (TW); Jian-Hao Chen, Wujie Township (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 150 days.

(21) Appl. No.: 14/273,963

(22) Filed: May 9, 2014

(65) Prior Publication Data

US 2015/0115887 A1    Apr. 30, 2015

(30) Foreign Application Priority Data

Oct. 31, 2013  (TW) .............................. 102139538 A

(51) Int. Cl.
| | | |
|---|---|---|
| H02J 7/14 | (2006.01) | |
| H02J 7/00 | (2006.01) | |
| H02N 2/00 | (2006.01) | |
| B60C 23/02 | (2006.01) | |
| H02N 2/18 | (2006.01) | |
| H02J 7/34 | (2006.01) | |
| H02J 17/00 | (2006.01) | |

(52) U.S. Cl.
CPC ................. *H02N 2/181* (2013.01); *H02N 2/18* (2013.01); *H02J 7/34* (2013.01); *H02J 17/00* (2013.01); *Y10S 74/09* (2013.01)

(58) Field of Classification Search
CPC ...... H02N 2/18; B60C 23/0411; H02J 7/0042
USPC ........... 310/339, 328; 320/104, 109; 73/146.5
See application file for complete search history.

(56) References Cited

U.S. PATENT DOCUMENTS

| | | | | |
|---|---|---|---|---|
| 6,029,787 A * | 2/2000 | Reik | ..................... | F16D 13/585 192/111.19 |
| 7,936,109 B1 * | 5/2011 | Gao | ..................... | H02N 2/186 310/329 |
| 8,011,237 B2 * | 9/2011 | Gao | ..................... | B60C 23/0411 73/146.5 |
| 8,393,149 B2 * | 3/2013 | Jones | ..................... | F03D 3/061 415/60 |
| 8,742,912 B2 * | 6/2014 | Blanchard | ............. | B60C 23/041 340/442 |
| 2007/0063621 A1 * | 3/2007 | Haswell | ............. | B60C 23/0408 310/339 |
| 2008/0258581 A1 * | 10/2008 | Schmidt | ............... | B60C 23/041 310/348 |
| 2012/0255349 A1 * | 10/2012 | Pop | ..................... | B60C 23/0413 73/146.5 |
| 2015/0042211 A1 * | 2/2015 | Pan | ..................... | B60C 23/0411 310/339 |

FOREIGN PATENT DOCUMENTS

| | | |
|---|---|---|
| CN | 101837739 A | 9/2010 |
| TW | M352472 U | 3/2009 |

* cited by examiner

*Primary Examiner* — M'Baye Diao
(74) *Attorney, Agent, or Firm* — Birch, Stewart, Kolasch & Birch, LLP

(57) ABSTRACT

A transport vehicle includes a driving unit, a wheel and a charging system. The charging system includes an electricity-generating tire and a converting unit. The electricity-generating tire has a tire body mounted on the wheel, and a piezoelectricity generating unit disposed at the tire body and configured to output electricity when the piezoelectricity generating unit is subjected to mechanical forces attributed to movement of the tire body on a ground surface. The converting unit operates to convert the electricity outputted by the piezoelectricity generating unit into a form of energy for storage in an energy storing unit.

30 Claims, 3 Drawing Sheets

TRANSPORT VEHICLE, CHARGING SYSTEM AND ELECTRICITY-GENERATING TIRE

CROSS-REFERENCE TO RELATED APPLICATION

This application claims priority of Taiwanese application no. 102139538, filed on Oct. 31, 2013.

BACKGROUND OF THE INVENTION

1. Field of the Invention

The present invention relates to a transport vehicle, a charging system for the transport vehicle, and an electricity-generating tire.

2. Description of the Related Art

Most vehicles consume gasoline as an energy source. In view of air pollution due to exhausted gas from vehicles and energy crisis due to continued global increase in petroleum demand, research and development in electric vehicles are increasing.

The maximum distance that an electric vehicle can travel is limited by the density of its battery, and thus methods for converting other forms of energy into electrical energy for charging a battery are an important area of research, in order to improve the maximum distance electric vehicles can travel.

SUMMARY OF THE INVENTION

The object of the present invention is to provide a transport vehicle having an electricity-generating tire that can charge an energy storing unit.

According to one aspect of the present invention, there is provided a transport vehicle comprising a driving unit, a wheel coupled to and driven rotatably by the driving unit, an energy storing unit coupled electrically to the driving unit for supplying electricity thereto, and a charging system.

The charging system includes an electricity-generating tire and a converting unit. The electricity-generating tire has a tire body mounted on the wheel, and a piezoelectricity generating unit disposed at the tire body and configured to output electricity when the piezoelectricity generating unit is subjected to mechanical forces attributed to movement of the tire body on a ground surface. The converting unit is coupled electrically to the energy storing unit and the piezoelectricity generating unit, and is operable to convert the electricity outputted by the piezoelectricity generating unit into a form of energy for storage in the energy storing unit.

Another object of the present invention is to provide a charging system for a transport vehicle.

According to another aspect of the present invention, a transport vehicle includes a driving unit, a wheel coupled to and driven rotatably by the driving unit, and an energy storing unit coupled electrically to the driving unit for supplying electricity thereto. A charging system for the transport vehicle comprises an electricity-generating tire and a converting unit.

The electricity-generating tire has a tire body to be mounted on the wheel, and a piezoelectricity generating unit disposed at the tire body and configured to output electricity when the piezoelectricity generating unit is subjected to mechanical forces attributed to movement of the tire body on a ground surface.

The converting unit is coupled electrically to the piezoelectricity generating unit, is to be coupled to the energy storing unit, and is operable to convert the electricity outputted by the piezoelectricity generating unit into a form of energy for storage in the energy storing unit.

Yet another object of the present invention is to provide an electricity-generating tire.

According to yet another aspect of the present invention, an electricity-generating tire comprises a tire body configured for mounting on a wheel, and a piezoelectricity generating unit disposed at the tire body and configured to output electricity when the piezoelectricity generating unit is subjected to mechanical forces attributed to movement of the tire body on a ground surface.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
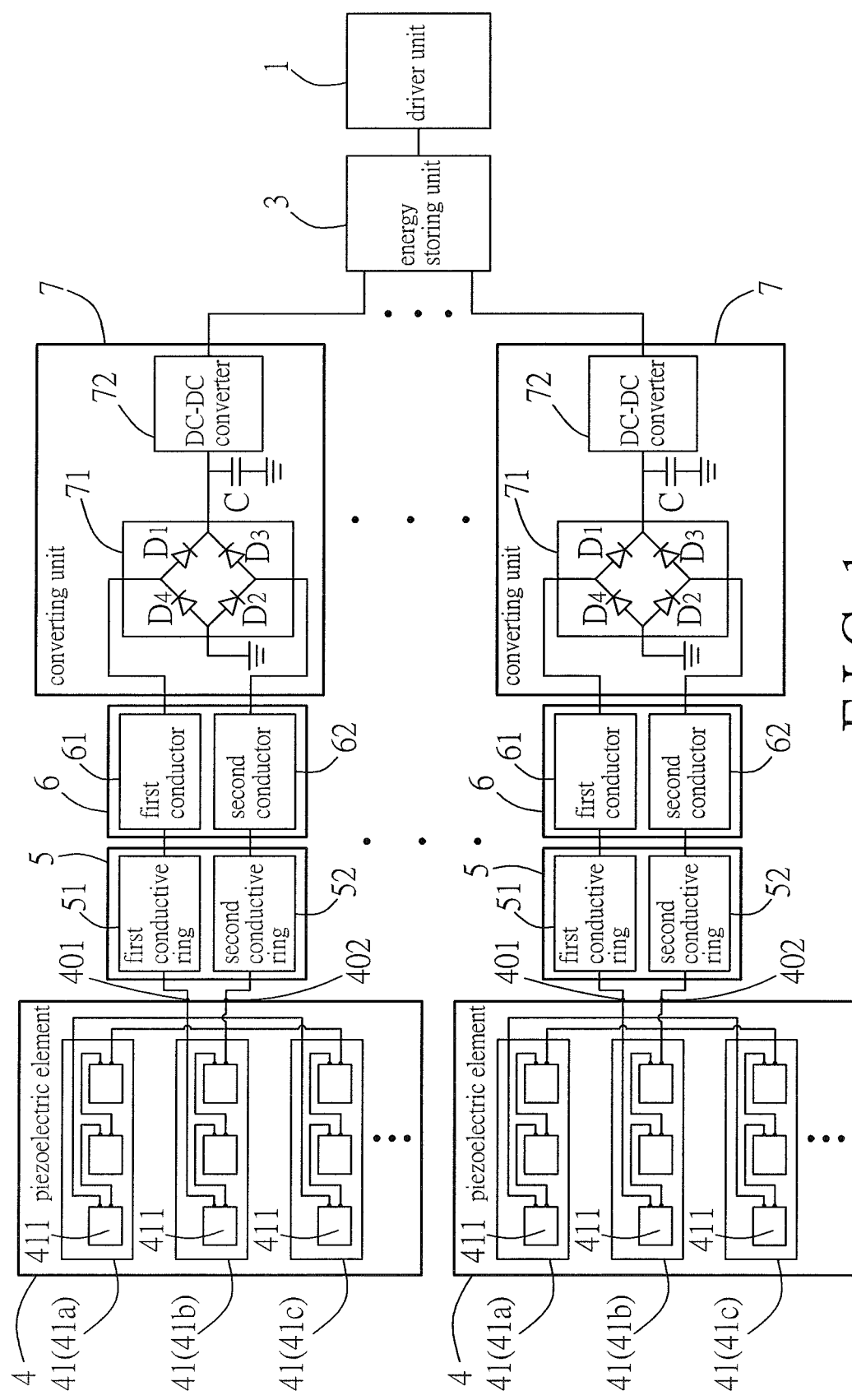
FIG. 1 is a schematic block diagram illustrating electrical connections of components of a transport vehicle in a preferred embodiment of the present invention.
Figure 2:
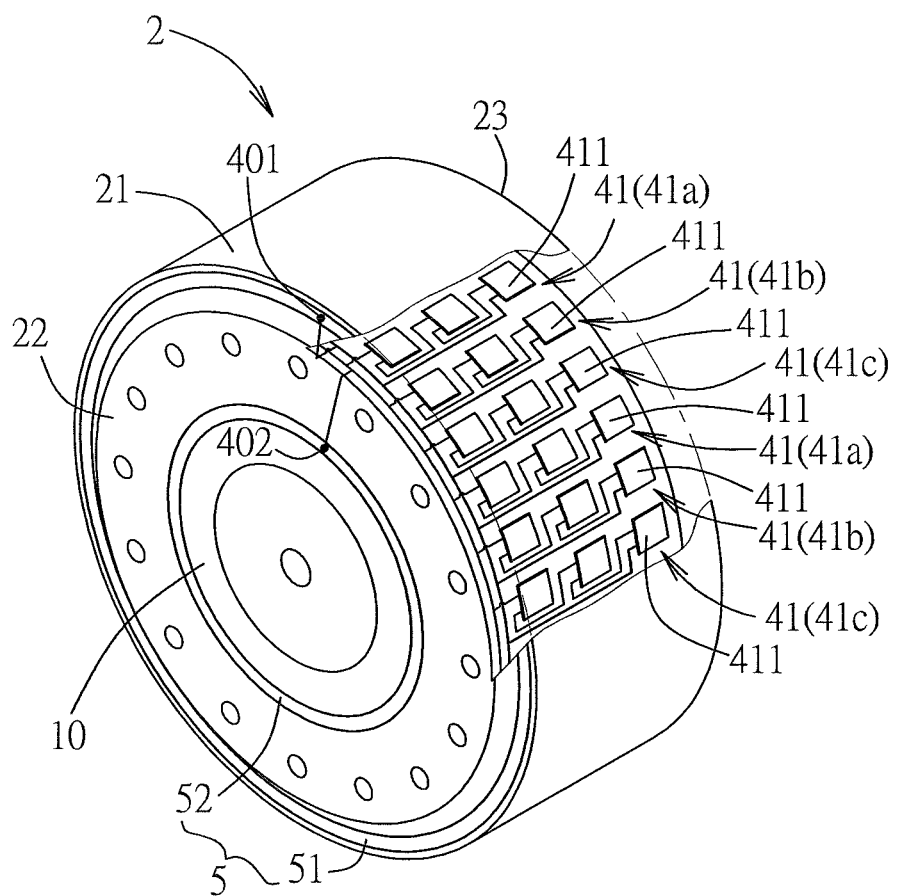
FIG. 2 is a schematic diagram illustrating a wheel, a conductive ring unit, and a plurality of piezoelectric elements embedded in an annular tread of a tire body and coupled electrically with the conductive ring unit.
Figure 3:
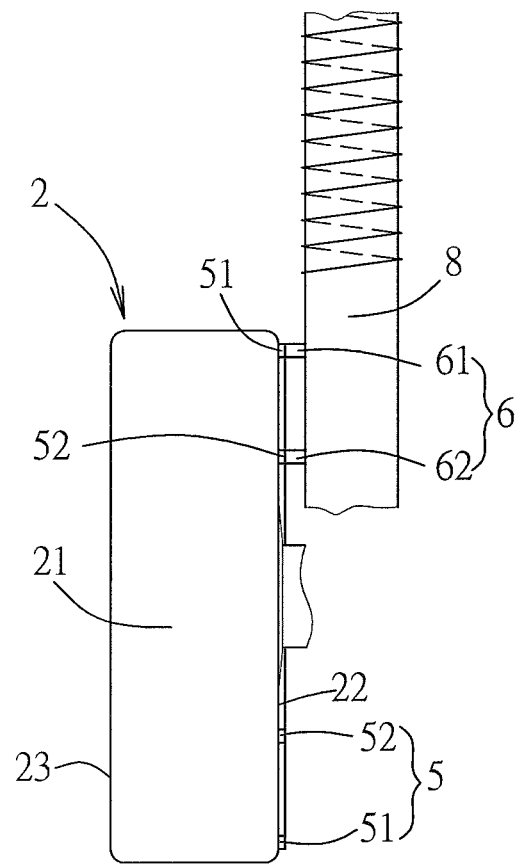
FIG. 3 is a schematic diagram illustrating a conductor unit disposed on a shock absorber and contacting electrically a first conductive ring and a second conductive ring of the conductive ring unit.

Referring to FIGS. 1, 2 and 3, a preferred embodiment of a transport vehicle of the present invention includes a driving unit 1, a plurality of wheels 10 (only one is shown) coupled to and driven rotatably by the driving unit 1, an energy storing unit 3 coupled electrically to the driving unit 1 for supplying electricity thereto, and a plurality of charging systems that correspond respectively to the wheels 10. Each charging system includes an electricity-generating tire, a conductive ring unit 5, a conductor unit 6, and a converting unit 7. The electricity-generating tire includes a tire body 2 mounted on a respective one of the wheels 10, and a piezoelectricity generating unit 4. In this preferred embodiment, the transport vehicle is an electric vehicle, the driving unit 1 includes a traction motor, and the energy storing unit 3 includes a lithium ion battery.

In this embodiment, the transport vehicle includes four wheels 10 that are coupled to and driven rotatably by the driving unit 1. The tire body 2 of the electricity-generating tire of each charging system includes an annular tread 21 surrounding the respective wheel 10, and an inner annular sidewall 22 and an external annular sidewall 23 that extend from the annular tread 21. An outer surface of the annular tread 21 serves to contact a ground surface (not shown). The piezoelectricity generating unit 4 is embedded in the annular tread 21 of the tire body 2 in this embodiment, but the present invention should not be limited in this respect.

The piezoelectricity generating unit 4 has a first terminal 401 and a second terminal 402. In this embodiment, the piezoelectricity generating unit 4 of the electricity-generating tire of each charging system includes a plurality of piezoelectric sub-units 41 electrically coupled in parallel. Each of the piezoelectric sub-units 41 includes a plurality of piezoelectric elements 411 electrically coupled in series. When the transport vehicle is moving on the ground surface, the piezoelectricity generating units 4 are subjected to mechanical forces (normal forces and sheer stresses due to gravity and friction respectively) attributed to movement of the tire bodies 2 on the ground surface, causing intermittent deformation of the piezoelectric elements 411 of the piezoelectricity generating units 4 to generate electricity that is outputted from the first terminal 401 and the second terminal 402 of each of the piezoelectricity generating units 4.

The speed of the rotation of the tire bodies 2 changes according to different speeds of the transport vehicle, and thus a frequency of the piezoelectric elements 411 of the piezoelectricity generating units 4 being compressed due to mechanical forces changes accordingly. Therefore, in this embodiment, the piezoelectric sub-units 41 include a plurality of first piezoelectric sub-units 41a that operate at a first frequency, a plurality of second piezoelectric sub-units 41b that operate at a second frequency different from the first frequency, and a plurality of third piezoelectric sub-units 41c that operate at a third frequency that is different from the first frequency and the second frequency, such that the piezoelectric sub-units 41 are able to generate electricity at different speeds of the transport vehicle.

Furthermore, the first piezoelectric sub-units 41a, second piezoelectric sub-units 41b and the third piezoelectric sub-units 41c are arranged in an interleaving manner. Specifically, each of the first piezoelectric sub-units 41a is disposed between an adjacent pair of the second piezoelectric sub-units 41b and an adjacent pair of the third piezoelectric sub-units 41c, each of the second piezoelectric sub-units 41b is disposed between an adjacent pair of the first piezoelectric sub-units 41a and an adjacent pair of the third piezoelectric sub-units 41c, and each of the third piezoelectric sub-units 41c is disposed between an adjacent pair of the first piezoelectric sub-units 41a and an adjacent pair of the second piezoelectric sub-units 41b. In this manner, each of the first piezoelectric sub-units 41a, second piezoelectric sub-units 41b and the third piezoelectric sub-units 41c may be distributed evenly in the tire bodies 2.

The conductive ring unit 5 of each charging system includes a first conductive ring 51 coupled electrically to the first terminal 401 of the piezoelectricity generating unit 4 and a second conductive ring 52 coupled electrically to the second terminal 402 of the piezoelectricity generating unit 4. The first conductor ring 51 and the second conductor ring 52 are disposed on the tire body 2 and are coaxial with the wheel 10. In this embodiment, the conductor ring unit 5 is disposed on an outer wall surface of the inner annular sidewall 22 of the tire body 2. In this embodiment, the conductive ring unit 5 is made of copper.

The conductor unit 6 of each charging system includes a first conductor 61 and a second conductor 62, and is preferably disposed on a shock absorber 8 of the transport vehicle. As the wheels 10 rotates, the first conductor 61 and the second conductor 62 maintain electrical contact with the first conductive ring 51 and the second conductive ring 52 of the corresponding conductive ring unit 5, respectively. In this embodiment, the first conductor 61 and the second conductor 62 are carbon brushes.

The converting unit 7 of each charging system has a first input terminal electrically coupled with the first conductor 61 of the corresponding conductor unit 6, a second input terminal electrically coupled with the second conductor 62 of the corresponding conductor unit 6, and an output terminal coupled electrically to the energy storage unit 3. The converting unit 7 receives electricity outputted by the corresponding piezoelectricity generating unit 4 through the first conductor 61 and the second conductor 62 of the corresponding conductor unit 6, and operates to convert the electricity into a form of energy for storage in the energy storing unit 3. Specifically, the converting unit 7 includes a rectifier 71, a capacitor C, and a direct current to direct current (DC-DC) converter 72.

In this embodiment, the rectifier 71 is a full-bridge diode rectifier having the first input terminal of the converting unit 7, the second input terminal of the converting unit 7, a rectifier output terminal, and a rectifier ground terminal coupled electrically to a reference ground. In detail, the rectifier 71 includes a first diode D1 having an anode and a cathode coupled electrically to the first input terminal of the converting unit 7 and the rectifier output terminal, respectively, a second diode D2 having an anode and a cathode coupled electrically to the rectifier ground terminal and the second input terminal of the converting unit 7, respectively, a third diode D3 having an anode and a cathode coupled electrically to the second input terminal of the converting unit 7 and the rectifier output terminal, respectively, and a fourth diode D4 having an anode and a cathode coupled electrically to the rectifier ground terminal and the first input terminal of the converting unit 7, respectively.

When the transport vehicle is moving, sections of the annular tread 21 contact the ground surface periodically. When a section of the annular tread 21 that contacts the ground surface is subsequently freed from ground contact, a restoration force on the annular tread 21 and the piezoelectric elements 411 may cause tension on the piezoelectric elements 411. Such tension may cause the piezoelectric elements 411 to generate a reverse electric current that needs rectification using the rectifier 71.

The capacitor C has a first capacitor terminal coupled electrically to the rectifier output terminal of the rectifier 71, and a second capacitor terminal coupled electrically to the reference ground. The capacitor C provides voltage stabilizing and filtering.

The direct current to direct current (DC-DC) converter 72 has a first converter terminal coupled electrically to the first capacitor terminal, and a second converter terminal serving as the output terminal of the converting unit 7. The direct current to direct current (DC-DC) converter 72 receives electricity and converts its electric voltage to one that is suitable for output to the energy storing unit 3. Thus, the energy storing unit 3 can be charged as the transport vehicle moves, providing "charge-as-you-go" functionality.

In summary, electricity is generated by the piezoelectricity generating unit 4, is conducted through the conductive ring unit 5 and the conductor unit 6, and is then converted by the converting unit 7 for storage in the energy storing unit 3. By this virtue, the transport vehicle is charged as it moves, and thus improving its ability to operate and travel a longer distance.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A transport vehicle comprising:
   a driving unit;
   a wheel coupled to and driven rotatably by the driving unit;
   an energy storing unit coupled electrically to the driving unit for supplying electricity thereto; and
   a charging system including
      an electricity-generating tire having a tire body mounted on the wheel, and a piezoelectricity generating unit disposed at the tire body and configured to output electricity when the piezoelectricity generating unit is subjected to mechanical forces attributed to movement of the tire body on a ground surface, and a converting unit coupled electrically to the energy storing unit and the piezoelectricity generating unit, and operable to convert the electricity outputted by the piezoelectricity generating unit into a form of energy for storage in the energy storing unit, wherein:

the piezoelectricity generating unit has a first terminal and a second terminal;

the converting unit having a first input terminal, a second input terminal, and an output terminal coupled electrically to the energy storage unit; and the charging system further includes:

a conductive ring unit that includes a first conductive ring coupled electrically to the first terminal of the piezoelectricity generating unit and a second conductive ring coupled electrically to the second terminal of the piezoelectricity generating unit, the first conductive ring and the second conductive ring being disposed on the tire body and being coaxial with the wheel; and a conductor unit including a first conductor coupled electrically to the first input terminal of the converting unit, and a second conductor coupled electrically to the second input terminal of the converting unit, the first conductor and the second conductor being configured to contact electrically and respectively the first conductive ring and the second conductive ring as the tire body rotates with the wheel.

2. The transport vehicle according to claim 1, wherein the piezoelectricity generating unit includes a plurality of piezoelectric sub-units electrically coupled in parallel, each of the piezoelectric sub-units including a plurality of piezoelectric elements electrically coupled in series.

3. The transport vehicle according to claim 2, wherein the piezoelectric sub-units include a plurality of first piezoelectric sub-units that operate at a first frequency, and a plurality of second piezoelectric sub-units that operate at a second frequency different from the first frequency.

4. The transport vehicle according to claim 1, wherein the tire body includes an annular tread surrounding the wheel, and two annular sidewalls that extend from the annular tread, the conductive ring unit being disposed on an outer wall surface of one of the two annular sidewalls.

5. The transport vehicle according to claim 4, wherein the piezoelectricity generating unit is embedded in the annular tread of the tire body.

6. The transport vehicle according to claim 1, further comprising a shock absorber, the conductor unit being disposed on the shock absorber.

7. The transport vehicle according to claim 1, wherein the converting unit includes:

a rectifier having the first input terminal of the converting unit, the second input terminal of the converting unit, a rectifier output terminal, and a rectifier ground terminal coupled electrically to a reference ground;

a capacitor having a first capacitor terminal coupled electrically to the rectifier output terminal of the rectifier, and a second capacitor terminal coupled electrically to the reference ground; and a direct current to direct current (DC-DC) converter having a first converter terminal coupled electrically to the first capacitor terminal, and a second converter terminal serving as the output terminal of the converting unit.

8. The transport vehicle according to claim 7, wherein the rectifier is a full-bridge diode rectifier.

9. The transport vehicle according to claim 1, wherein at least one of the first conductor and the second conductor is a carbon brush.

10. The transport vehicle according to claim 1, wherein the energy storage unit includes a lithium ion battery.

11. The transport vehicle according to claim 1, wherein the transport vehicle comprises a plurality of the wheels, and a plurality of the charging systems that correspond respectively to the wheels.

12. The transport vehicle according to claim 1, wherein the driving unit includes a traction motor.

13. A transport vehicle comprising:

a driving unit;

a wheel coupled to and driven rotatably by the driving unit;

an energy storing unit coupled electrically to the driving unit for supplying electricity thereto; and a charging system including an electricity-generating tire having a tire body mounted on the wheel, and a piezoelectricity generating unit disposed at the tire body configured to output electricity when the piezoelectricity generating unit is subjected to mechanical forces attributed to movement of the tire body on a ground surface, and a converting unit coupled electrically to the energy storing unit and the piezoelectricity generating unit, and operable to convert the electricity outputted by the piezoelectricity generating unit into a form of energy for storage in the energy storing unit, wherein the piezoelectric sub-units include a plurality of first piezoelectric sub-units that operate at a first frequency, and a plurality of second piezoelectric sub-units that operate at a second frequency different from the first frequency, and wherein the piezoelectric sub-units further include a plurality of third piezoelectric sub-units that operate at a third frequency that is different from the first frequency and the second frequency.

14. The transport vehicle according to claim 13, wherein each of the first piezoelectric sub-units is disposed between an adjacent pair of the second piezoelectric sub-units and an adjacent pair of the third piezoelectric sub-units, each of the second piezoelectric sub-units is disposed between an adjacent pair of the first piezoelectric sub-units and an adjacent pair of the third piezoelectric sub-units, and each of the third piezoelectric sub-units is disposed between an adjacent pair of the first piezoelectric sub-units and an adjacent pair of the second piezoelectric sub-units.

15. A charging system for a transport vehicle, the transport vehicle including a driving unit, a wheel coupled to and driven rotatably by the driving unit, and an energy storing unit coupled electrically to the driving unit for supplying electricity thereto, the charging system comprising:

an electricity-generating having a tire body to be mounted on the wheel, and a Piezoelectricity generating unit disposed at the tire body and configured to output electricity when the piezoelectricity generating unit is subjected to mechanical forces attributed to movement of the tire body on a ground surface; and a converting unit coupled electrically to the piezoelectricity generating unit, to be coupled to the energy storing unit, and operable to convert the electricity outputted by the piezoelectricity generating unit into a form of energy for storage in the energy storing unit, wherein:

the piezoelectricity generating unit has a first terminal and a second terminal;

the converting unit having a first input terminal, a second input terminal, and an output terminal coupled electrically to the energy storage unit; and the charging system further comprises:
a conductive ring unit that includes a first conductive ring coupled electrically to the first terminal of the piezoelectricity generating unit and a second conductive ring coupled electrically to the second terminal of the piezoelectricity generating unit, the first conductive ring and the second conductive ring being disposed on the tire body and being coaxial with the wheel; and
a conductor unit having a first conductor coupled electrically to the first input terminal of the converting unit, and a second conductor coupled electrically to the second input terminal of the converting unit, the first conductor and the second conductor being configured to contact electrically and respectively the first conductive ring and the second conductive ring as the tire body rotates with the wheel.

16. The charging system according to claim 15, wherein the piezoelectricity generating unit includes a plurality of piezoelectric sub-units electrically coupled in parallel, each of the piezoelectric sub-units including a plurality of piezoelectric elements electrically coupled in series.

17. The charging system according to claim 16, wherein the piezoelectric sub-units include a plurality of first piezoelectric sub-units that operate at a first frequency, and a plurality of second piezoelectric sub-units that operate at a second frequency different from the first frequency.

18. The charging system according to claim 15, wherein the tire body includes an annular tread surrounding the wheel, and two annular sidewalls that extend from the annular tread, the conductive ring unit being disposed on an outer wall surface of one of the two annular sidewalls.

19. The charging system according to claim 18, wherein the piezoelectricity generating unit is embedded in the annular tread of the tire body.

20. The charging system according to claim 15, wherein the converting unit includes:
a rectifier having the first input terminal of the converting unit, the second input terminal of the converting unit, a rectifier output terminal, and a rectifier ground terminal coupled electrically to a reference ground;
a capacitor having a first capacitor terminal coupled electrically to the rectifier output terminal of the rectifier, and a second capacitor terminal coupled electrically to the reference ground; and
a direct current to direct current (DC-DC) converter having a first converter terminal coupled electrically to the first capacitor terminal, and a second converter terminal serving as the output terminal of the converting unit.

21. The charging system according to claim 15, wherein at least one of the first conductor and the second conductor is a carbon brush.

22. A charging system for a transport vehicle, the transport vehicle including a driving unit, a wheel coupled to and driven rotatably by the driving unit, and an energy storing unit coupled electrically to the driving unit for supplying electricity thereto, the charging system comprising:
an electricity-generating having a tire body to be mounted on the wheel, and a piezoelectricity generating unit disposed at the tire body and configured to output electricity when the piezoelectricity generating unit is subjected to mechanical forces attributed to movement of the tire body on a ground surface; and
a converting unit coupled electrically to the piezoelectricity generating unit, to be coupled to the energy storing unit, and operable to convert the electricity outputted by the piezoelectricity generating unit into a form of energy for storage in the energy storing unit,
wherein the piezoelectricity generating unit includes a plurality of piezoelectric sub-units electrically coupled in parallel, each of the piezoelectric sub-units including a plurality of piezoelectric elements electrically coupled in series,
wherein the piezoelectric sub-units include a plurality of first piezoelectric sub-units that operate at a first frequency, and a plurality of second piezoelectric sub-units that operate at a second frequency different from the first frequency, and
wherein the piezoelectric sub-units further include a plurality of third piezoelectric sub-units that operate at a third frequency that is different from the first frequency and the second frequency.

23. The charging system according to claim 22, wherein each of the first piezoelectric sub-units is disposed between an adjacent pair of the second piezoelectric sub-units and an adjacent pair of the third piezoelectric sub-units, each of the second piezoelectric sub-units is disposed between an adjacent pair of the first piezoelectric sub-units and an adjacent pair of the third piezoelectric sub-units, and each of the third piezoelectric sub-units is disposed between an adjacent pair of the first piezoelectric sub-units and an adjacent pair of the second piezoelectric sub-units.

24. An electricity-generating tire comprising:
a tire body configured for mounting on a wheel; and
a piezoelectricity generating unit disposed at the tire body and configured to output electricity when the piezoelectricity generating unit is subjected to mechanical forces attributed to movement of the tire body on a ground surface,
wherein the piezoelectricity generating unit has a first terminal and a second terminal, the electricity-generating tire further comprising:
a conductive ring unit that includes a first conductive ring coupled electrically to the first terminal of the piezoelectricity generating unit and a second conductive ring coupled electrically to the second terminal of the piezoelectricity generating unit, the first conductive ring and the second conductive ring being disposed on the tire body and being coaxial with the wheel.

25. The electricity-generating tire according to claim 24, wherein the piezoelectricity generating unit includes a plurality of piezoelectric sub-units electrically coupled in parallel, each of the piezoelectric sub-units including a plurality of piezoelectric elements electrically coupled in series.

26. The electricity-generating tire according to claim 25, wherein the piezoelectric sub-units include a plurality of first piezoelectric sub-units that operate at a first frequency, and a plurality of second piezoelectric sub-units that operate at a second frequency different from the first frequency.

27. The electricity-generating tire according to claim 26, wherein the piezoelectric sub-units further include a plurality of third piezoelectric sub-units that operate at a third frequency that is different from the first frequency and the second frequency.

28. The electricity-generating tire according to claim 27, wherein each of the first piezoelectric sub-units is disposed between an adjacent pair of the second piezoelectric sub-units and an adjacent pair of the third piezoelectric sub-units, each of the second piezoelectric sub-units is disposed between an adjacent pair of the first piezoelectric sub-units and an adjacent pair of the third piezoelectric sub-units, and each of the third piezoelectric sub-units is disposed between an adjacent pair of the first piezoelectric sub-units and an adjacent pair of the second piezoelectric sub-units.

29. The electricity-generating tire according to claim 24, wherein the tire body includes an annular tread, and two annular sidewalls that extend from the annular tread, the conductive ring unit being disposed on an outer wall surface of one of the two annular sidewalls.

30. The electricity-generating tire according to claim 29, wherein the piezoelectricity generating unit is embedded in the annular tread of the tire body.

* * * * *